US007448835B1

(12) United States Patent
Forrester, Jr. et al.

(10) Patent No.: US 7,448,835 B1
(45) Date of Patent: Nov. 11, 2008

(54) SYSTEM AND METHOD FOR AUTOMATING PALLET PLACEMENT ON A PLATFORM

(75) Inventors: Robert M. Forrester, Jr., Oak Ridge, NJ (US); Michael Selk, Rockaway, NJ (US); Allen Brokaw, Trenton, NJ (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 375 days.

(21) Appl. No.: 11/308,109

(22) Filed: Mar. 7, 2006

(51) Int. Cl.
*B60P 7/08* (2006.01)
(52) U.S. Cl. .............................. 410/46; 410/32; 410/33; 410/69; 410/80; 410/82; 410/84
(58) Field of Classification Search .................... 410/31, 410/32, 33, 35, 46, 69, 80, 82, 84, 90, 91; 248/346.02, 346.03; 296/39.2; 108/55.1, 108/55.3, 55.5; 206/386, 596
See application file for complete search history.

(56) References Cited

U.S. PATENT DOCUMENTS 6,929,438 B1 * 8/2005 Foster et al. .................. 410/46

* cited by examiner

*Primary Examiner*—Stephen Gordon
(74) *Attorney, Agent, or Firm*—Michael Sachs

(57) ABSTRACT

An automatic pallet to platform locking system enables pallets of supplies or cargoes to automatically be locked down onto the top of a transportation platform, thus avoiding the use of tie down straps and allowing for automated material handling equipment (MHE) such as a forklift. The present system replaces older, difficult to reconfigure, mostly manual loading and unloading systems and methods with a mechanical interface that allows for relatively easy reconfiguration for different pallet sizes, and that can simplify the task of loading and unloading pallets. The mechanical interface between a pallet and a transportation platform or flatbed is a metal to metal interface. It eliminates the need to tie and secure a strap, which is a time consuming and manual process.

10 Claims, 15 Drawing Sheets

SYSTEM AND METHOD FOR AUTOMATING PALLET PLACEMENT ON A PLATFORM

FEDERAL INTEREST STATEMENT

The inventions described herein may be manufactured, used, and licensed by, or for the U.S. Government for U.S. Government purposes.

FIELD OF THE INVENTION

This invention relates to pallet loading. More particularly, the present invention relates to automating pallet loading and securing to a transportation platform with a mechanical interface.

BACKGROUND OF THE INVENTION

Truck has assumed an increasing role in the transportation of goods in societies with a network of roads. The system and method of loading and unloading goods or cargoes on trucks have been improved to increase flexibility and efficiency. The truck bed for holding cargo is usually flat, and came to be known as the flatbed. The cargo that used to be individually wrapped and strapped onto a truck bed is now placed on standardized beds called pallets that are loaded to and from a truck.

Improvements have been made to increase the efficiency of securing loads or pallets onto a truck bed (reference is made to U.S. Pat. Nos. 6,543,990 and 4,642,007). A palletizing system has been disclosed that includes a reusable pallet and a reusable anchoring device for securing cargo. A strap is received and released by a clamping mechanism in a housing on a pallet. A load is placed on a pallet. A strap is put around the load and the pallet. The strap is clamped in a clamping mechanism to secure the load to the pallet. To release the load from the pallet the strap is released from the clamping mechanism.

The load, generally of irregular shape from batch to batch, is typically manually placed onto the pallet till it is in a stable position. A strap has to be adjusted and tightened to the specific shape and size of the load without causing the load to become unstable, a time consuming process. The loading method is manual, varies from load to load, time consuming and often unsuitable for stacking more than a single layer. If only a part of the load needs to be unloaded, the whole load has to be un-strapped first, a portion is to be unloaded, and the remaining load needs to be strapped again, a time consuming and redundant process.

Another method was disclosed for a palletized cylinder distribution system. A raised walkway divides a network that mounts on the rear of a truck. On either side of the walkway the cylinders are placed on pallets that are disposed on the network. Tabs extend laterally from the base of the pallets. The tabs engage a flange defined by the walkway and another flange disposed on side-rails attached to the network, and hold the pallets in place. The bases of the pallets and the surface of the walkway define the bed of the truck. The cylinders are accessed through the walkway.

The loading system and method requires lateral loading of the pallets, and vertical loading of cylinders onto the pallets. It is designed for cylindrical loads and not so flexible to accommodate loads of a general shape and size. The flanges are linear and continuous from pallet to pallet, raising the possibility of damaging pallet to pallet collisions on delicate contents during loading, unloading and transport.

The walkway system constrains pallets by a flange defined by a walkway and another flange defined by a fold-up fence. The flanges are defined by the walkway and fold-up fence, and cannot be quickly reconfigured for different size pallets.

In general, an efficient and reliable loading system should be fast to load and reload cargoes of general shape and size. Further the system and method of loading and unloading cargoes should be repeatable every time, and be compatible with conventionally available material handling equipment (MHE) such as a forklift. The system should not utilize straps for security that tend to entangle in unexpected places and pose an obstacle to a fast and smooth loading and unloading process.

There is still an unsatisfied need for an efficient and reliable cargo loading and unloading system and associated method that are compatible with conventional material handling equipment, to expeditiously deliver critical mission cargo to the field.

SUMMARY OF THE INVENTION

The present invention satisfies this need, and presents a system and an associated method (collectively referred to herein as "the system" or "the present system") for efficient and reliable cargo loading and unloading with conventional moving equipment to expeditiously deliver critical mission cargo to the field.

An object of this invention is to provide a mechanical interface between a flatbed and a pallet that allows for automatic loading and unloading, and simplifies the overall loading process.

A further object of this invention is for self-alignment capability for a pallet to home in on the mechanical interface on the flatbed once the pallet is in the close vicinity.

Another object of this invention is to provide a quick to deploy re-configurable mechanical interface to accommodate pallets of various sizes.

Still an object of this invention is to individually lock each pallet in the mechanical interface for maximum security.

A further object of this invention is to provide flexibility for cargoes of different sizes and shapes.

The foregoing and other objects and features of the present invention are provided by a system that allows for the automatic retention and release of pallets onto the flatbed of a truck. The pallets have, for example, a base of approximately 50 inch by 40 inch. The flatbed has an exemplary length of approximately 20 feet and a width of approximately 8 feet. In general, the system is applicable to loading and unloading pallets of various sizes onto any surface that is sufficiently flat.

The present system enables pallets of supplies to automatically be locked down onto the top of a transportation platform, thus avoiding the use of tie down straps and allowing for automated material handling equipment (MHE) such as a forklift.

The present system replaces older, difficult to reconfigure, mostly manual loading and unloading systems and methods with a mechanical interface that allows for relatively easy reconfiguration for different pallet sizes, and that can simplify the task of loading and unloading cargo.

The mechanical interface between a pallet and a flatbed is a metal to metal interface. It does not utilize straps to eliminate the possibility that a loose strap may accidentally entangle with another object or pose a hazard. It also eliminates the need to tie and secure a strap, which is a time consuming and manual process. It further eliminates the need to re-strap a load after un-strapping when only a part of the load is required at a certain station.

The mechanical interface resides in both the transportation platform or flatbed and the pallet. The flatbed is equipped with mechanical interfaces, with each interface is to cooperate with a pendulum on the pallet. A number of mechanical interfaces are positioned on the flatbed to receive and secure a number of pallets. The interfaces may be positioned on the flatbed in a manner to receive and secure pallets of various sizes to further increase flexibility of the system.

The system allows improved security of pallets because most of the pallets are individually secured and positioned at an edge of the flatbed to make for easy access by a forklift. This is an improvement over the older, walkway system that constrain pallets by a flange defined by a walkway and another flange defined by a fold-up fence.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

The present system is referred to herein as an automatic pallet to platform locking system (APPLS) and includes a transportation platform and a pallet. The system has mechanical interface with components on both the transportation platform and the pallet that which mechanical interface is metal-to-metal.

Numerous embodiments of the APPLS concept are described herein. All of these embodiments operate on the same underlaying principle, but differ in mechanical manifestation of the solution.

Figure 1:
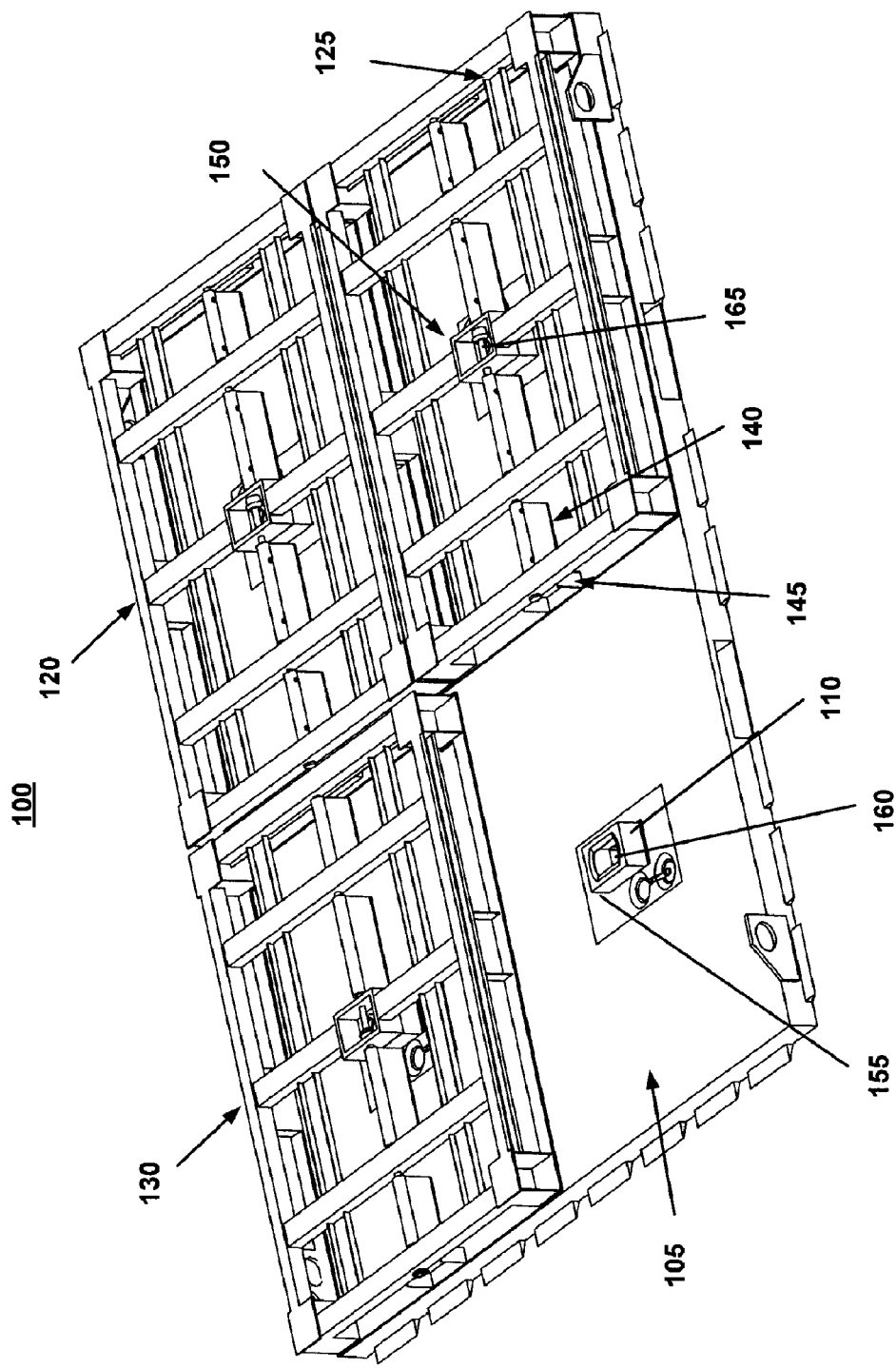
FIG. 1 represents an isometric view of a transportation platform having a platform or flatbed equipped with multiple platform mates which lock with pallets which are equipped with flaps.

FIG. 1 represents an isometric view of a transportation platform (in this exemplary case modeled after a United States Air Force 463L pallet) 100 having a platform or flatbed 105 equipped with multiple platform mates 110 which lock with pallets 120, 125 and 130 which are equipped with flaps 140. The platform or flatbed provides a base for support. Pallets 120 and 125 are placed on the flatbed 105 of the transportation platform 100 and locked with platform mates 110. Pallet 130 is being lowered onto the flatbed, centering over a platform mate. An individual platform mate 110 is shown available for a fourth pallet to lock. In an exemplary transportation platform 100 the flatbed 105 is of length 20 feet and width 8 feet, the platform mates 110 are arranged in rows and columns with corresponding pitches such that each pallet would lock with a platform mate.

In addition, the platform mate also provides a mechanical self-alignment capability. The transfer mechanism assembly 150 on the pallet has a matching feature shape to the hole 160 and cooperates with the hole on the platform mate 110 for locking the pallet. The platform mate has chamfers and rounds that bump the transfer mechanism assembly on the pallet to correct for alignment error and to guide it into the correct position to mate with the platform mate. Further, the transfer mechanism assembly of the pallet can lock with the platform mate.

An exemplary standard pallet 120 has a length of 50 inches and a width of 40 inches. The pallet has a base frame with a transfer mechanism assembly 150 for locking with the platform mate, two side ports 145 that each provides pivotal support for the flaps 140 that are rotated by fork tines of a standard or an automated material handling equipment (MHE) and causes the lock 215 to rotate. When the flap 210 is rotated, the lock 215 will slide into and out of the cooperating receptacle on the platform 110. When the flap 210 is allowed back to its non-rotated position, the lock 215 will rotate to a locked position, and will be unable to be removed from the cooperating receptacle 110.

The flap 140 as shown in FIG. 1 has a continuous surface to engage the fork tines. An exemplary flatbed would accommodate 8 pallets of the same kind arranged on the flatbed in 2 rows. Another exemplary flatbed would accommodate 4 pallets of the same kind arranged on the flatbed in 2 rows as shown in FIG. 1. The installation of platform mates on the flatbed can be reversed such that the flatbed returns to a clear top surface. The mechanical interface on the pallet includes a transfer mechanism assembly that locks with a platform mate on the flatbed or transportation platform.

The pallet 120 is equipped with forklift ports in its base frame for the fork tines to be inserted from two opposing sides, and the flaps 140 and locks 150, 215 are equipped to pivot bi-directionally around the vertical position.

Figure 10:
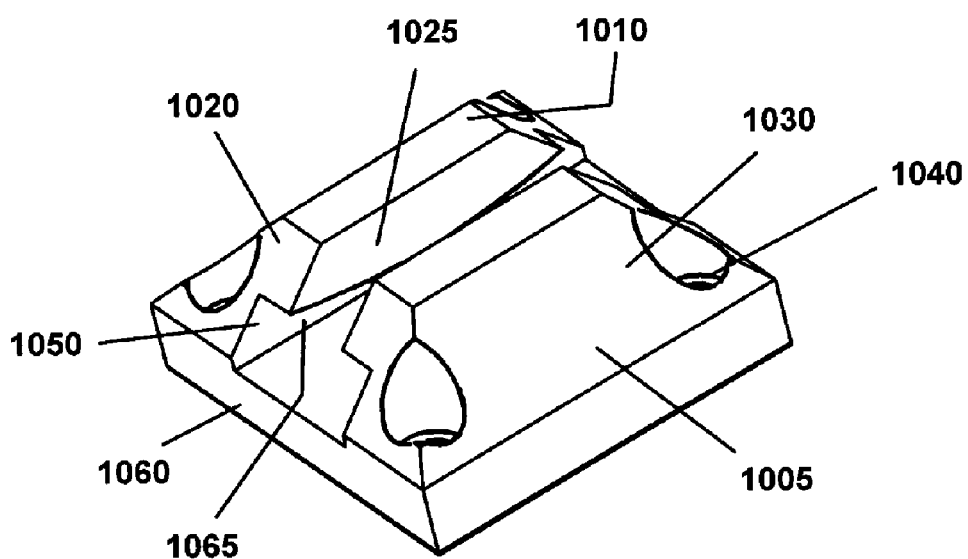
FIG. 10 represents an isometric view of the male mechanical interface that cooperates with and locks the pendulum mounted on a rotating pin through the pendulum housing in the pallet.
Figure 12:
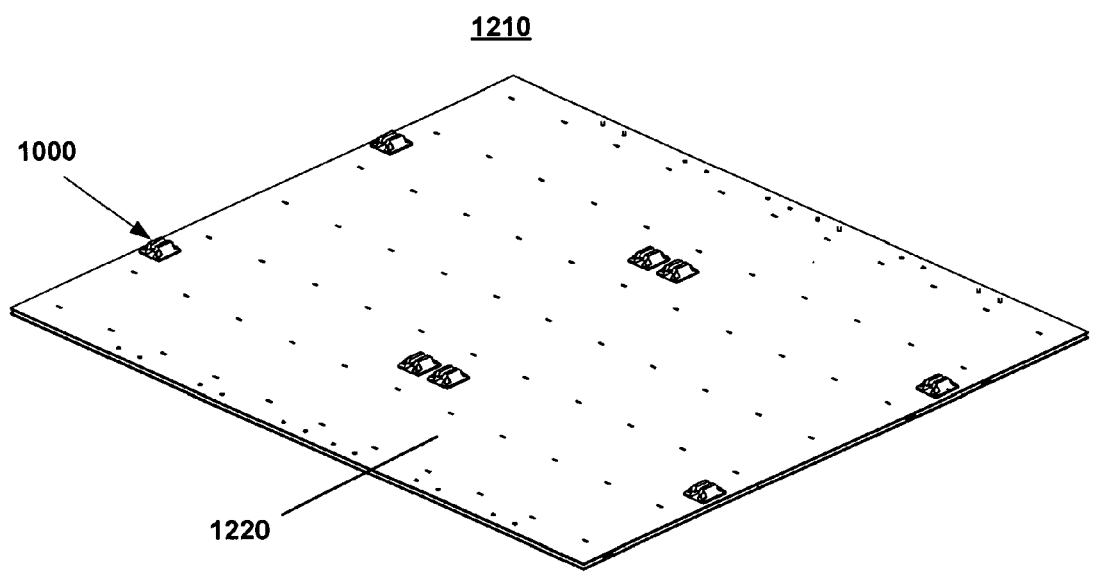
FIG. 12 represents an isometric view of the sled that is equipped with 8 male mechanical interfaces to lock with 8 pivotal pendulums from 4 pallets.
Figure 18:
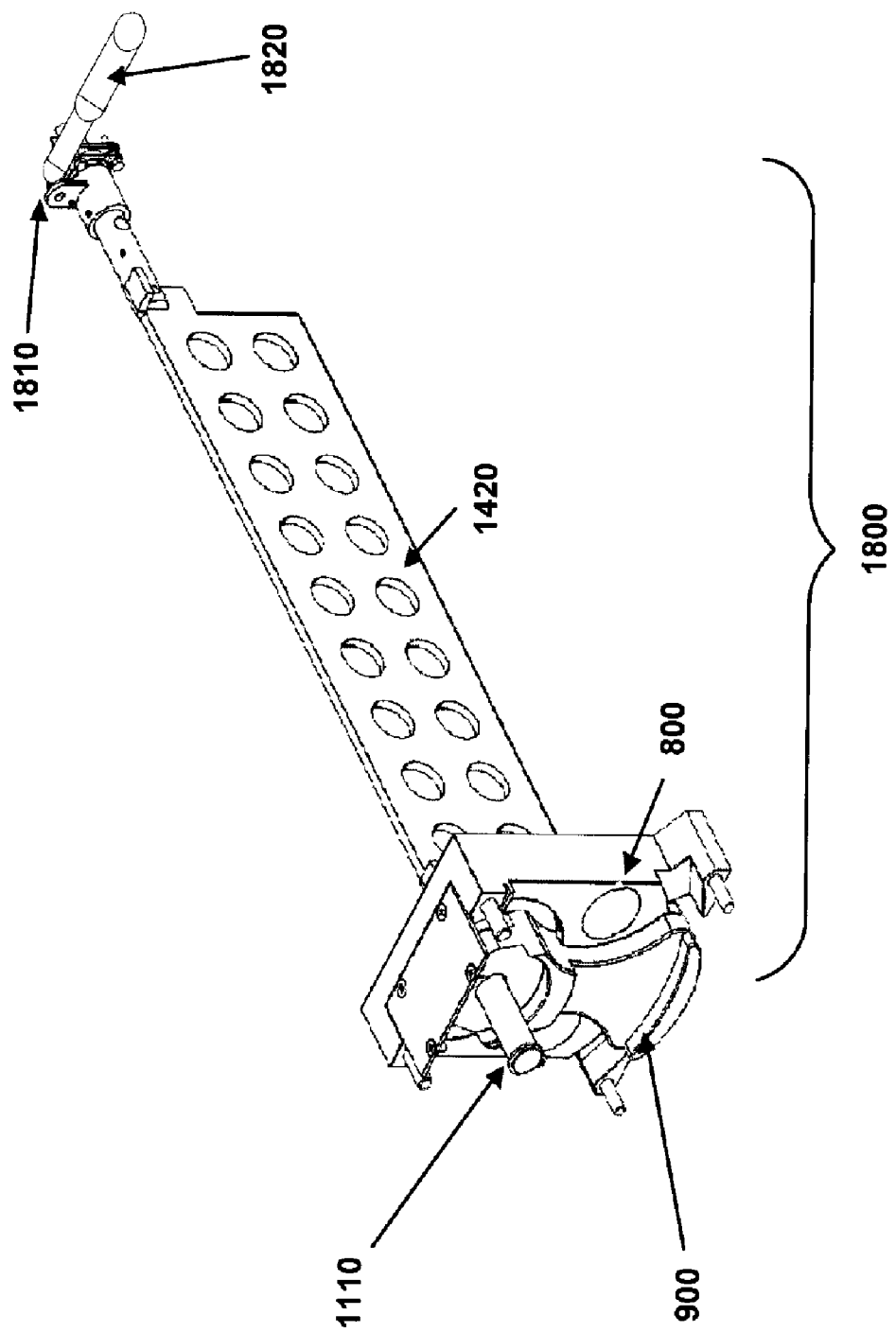
FIG. 18 represents another embodiment of the locking mechanism according to the present invention.

In an alternative embodiment, a sled 1210, shown in FIG. 12, is mounted onto a flatbed to form a transportation platform and is equipped with a multitude of male mechanical interfaces 1000, shown in FIG. 10, that are mounted onto the sled. Two male mechanical interfaces 1000 on a sled 1210 lock with two pendulums 900 from each pallet 120 configured with two pendulum assemblies 1800 mirrored about its center point 1810 (FIG. 18) instead of a central lock 150. In this scenario, the pendulum housing 800 resides within the edge of the pallet 145. A typical sled has a length of 100 inches and a width of 80 inches. The pendulum 900 and male mechanical interface 1000 can be used in this case instead of the platform mate 110 in the transportation platform 100 to lock the pallet 120.

The pendulum 900 (FIG. 4) rides in the circular track 845 in the pendulum housing 800. Each pendulum 900 is sandwiched between two housings 800, which mate together. Each pallet 120 has two of these sandwiched assemblies located at the midpoint of the short side of the pallet 145.

The forces in the lockdown scenario involving the pendulum 900 are transferred from the male lockdown feature 1000. As a result, the male lockdown feature 1000 is secured to the transportation platform 105 1220 via bolts through the bolt holes 1040. The pendulum 900 rotates into the male lockdown feature's center slot 1050. The lip of the male interface feature 1065 interfaces on both sides with the lip on the bottom of the pendulum 960. This force is then transferred through the pendulum length 945. This force is then transferred from the load bearing surface of the pendulum 965 to the load bearing surface of the pendulum housing 850. The pair of pendulum housings are affixed within the pallet base at the midpoint along the short edge of the pallet 145.

Figure 2:
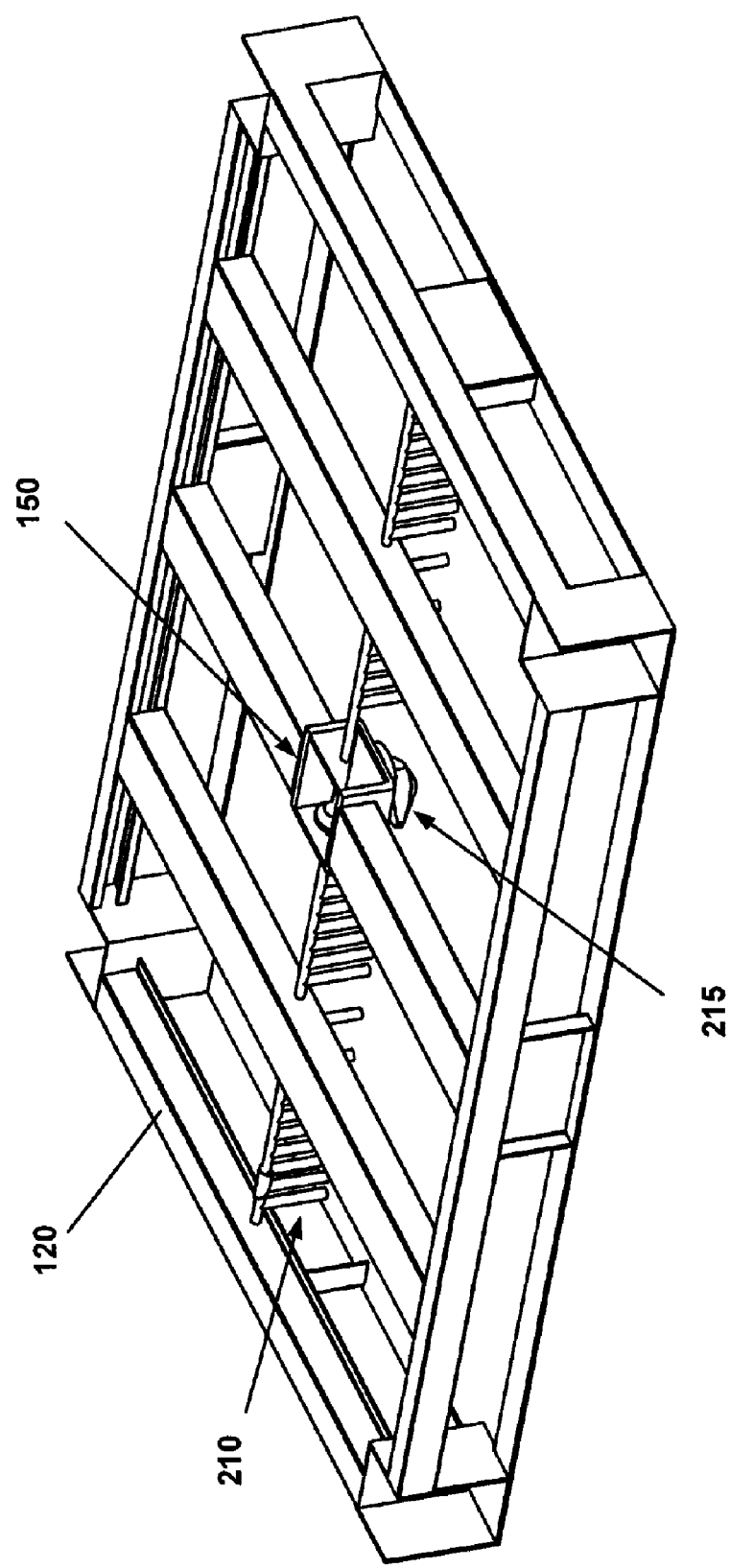
FIG. 2 represents a top isometric view of a pallet equipped with an alternate embodiment of the flap.
Figure 3:
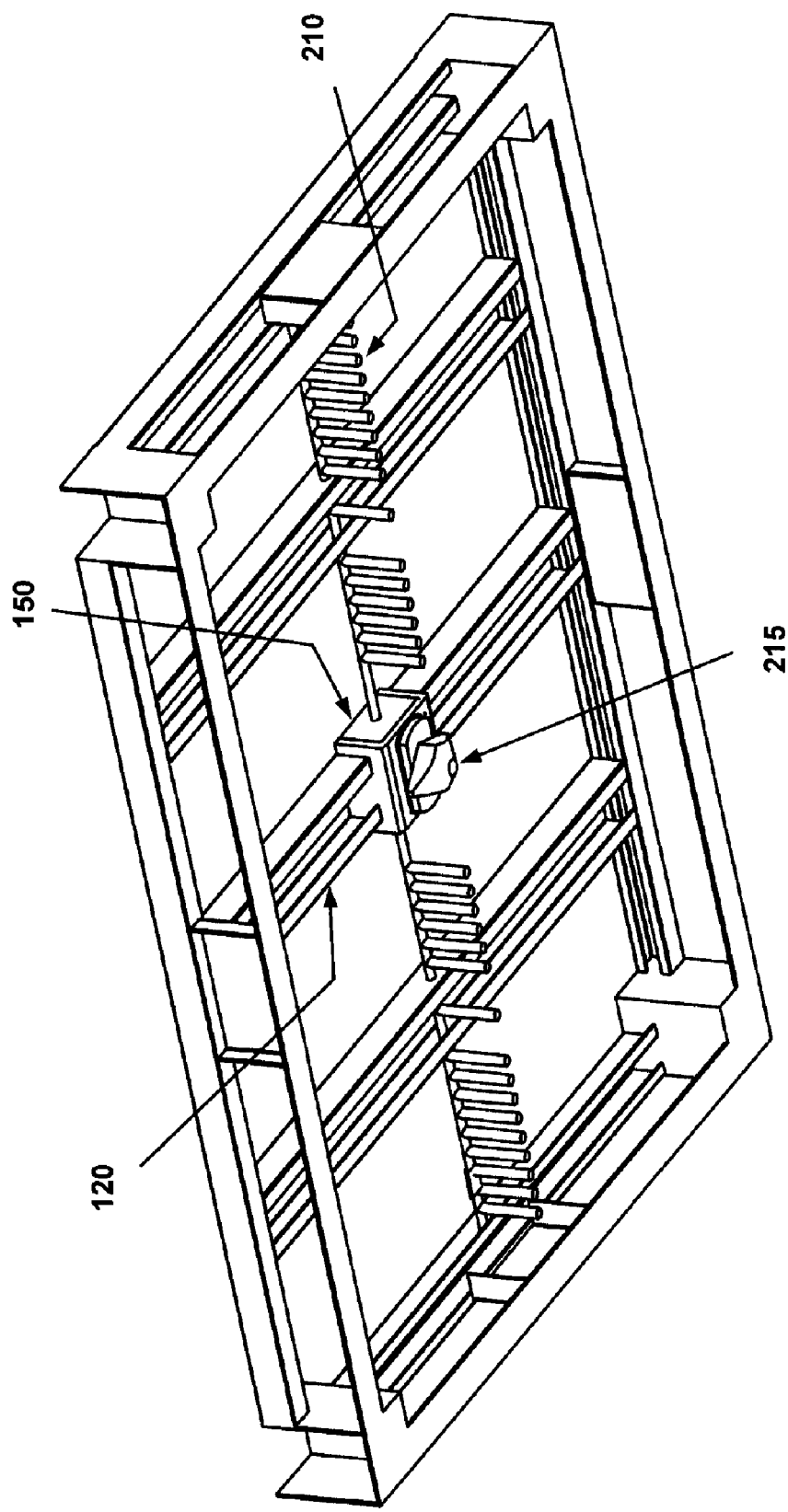
FIG. 3 represents a bottom isometric view of the pallet of FIG. 2.

The pallet 120 can be locked and unlocked in one of two ways. The first way to lock and unlock the pallet is by an automated material handling equipment (MHE) utilizing fork tines to rotate flaps in the pallet. FIG. 2 represents a top isometric view of a pallet 120 equipped with an alternate embodiment of a flap 210. In contrast to the continuous surface of the flap 140 in FIG. 1, the flap 210 in FIG. 2 has a multitude of substantially parallel posts mutually connected that interact with the tines of a forklift. FIG. 3 represents a bottom isometric view of the pallet 120 shown in FIG. 2.

Similar to the flap 140 in FIG. 1, the flap 210 in FIG. 2 can be rotated from a vertical position to a substantially horizontal position or sideways position as the tines of the forklift are inserted into the forklift ports in the pallet 120 to load and unload the pallet. Both the flap 140 and the flap 210 rotate on a pair of pivotal pins 1110 in version of the system that uses assembly 1800, As explained later in greater detail in FIG. 11, that are supported in the pallet by a side port 810.

Figure 13:
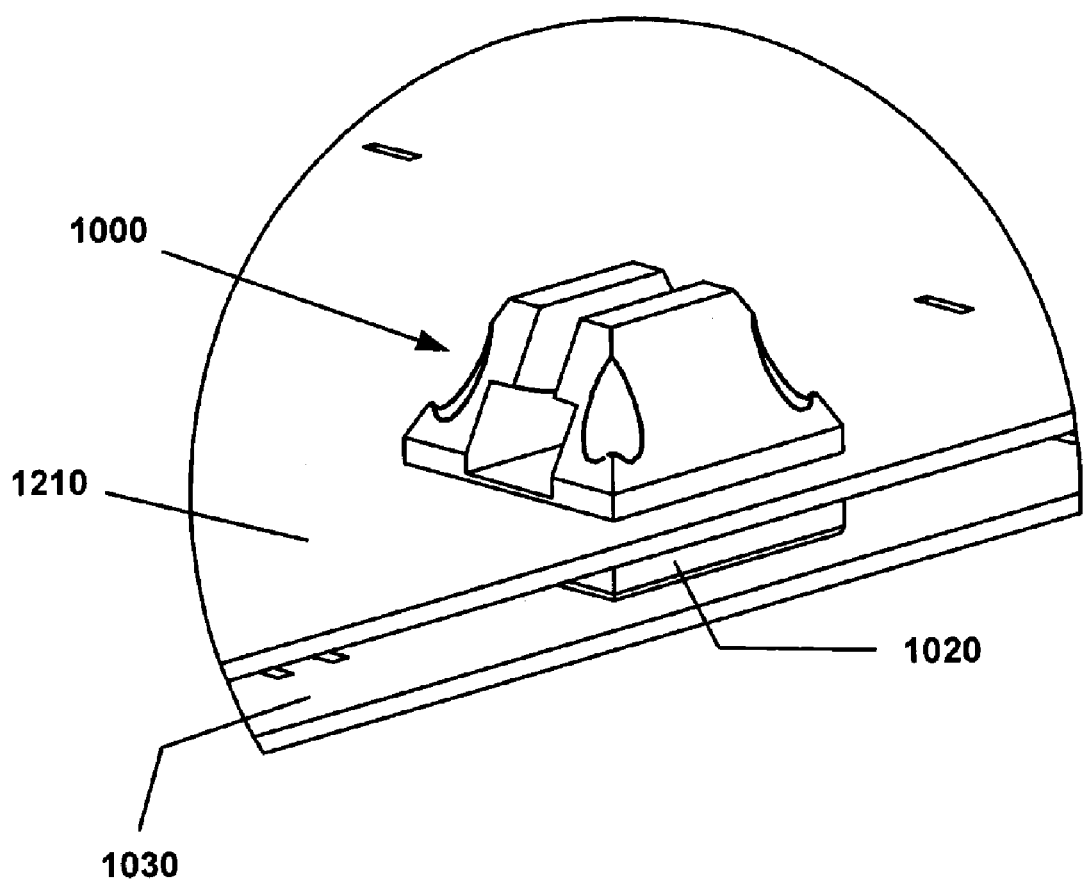
FIG. 13 represents an isometric view of the male mechanical interface mounted on a sled which in turn is mounted on a flatbed.

An embodiment to lock and unlock the pallet by the first way is by use of a pendulum 900 that is affixed to the pin 1110. As the flap at the side port 145 rotates sideways by the fork tines the pendulum also rotates similarly. After the pallet engages the platform mate with the transfer mechanism assembly 150 seated in the central hole 160 in the mate, the fork tines are withdrawn from the pallet. Gravity effect and springs 1820 rotates the flap and the pendulum from a substantially horizontal or sideways position to a vertical position, placing the pendulum 900 into a male mechanical interface 1000 shown in FIG. 10, which mechanical interface is suitably placed on the transportation platform 100 as shown in FIG. 13.

To unlock the pallet the fork tines are again inserted into the fork pocket of the pallet, rotating the flap sideways, inducing the pendulum to rotate similarly and unlocking from the male mechanical interface. At this point the pallet is ready to be raised from the transportation platform for unloading.

Another embodiment in the first way to lock and unlock the pallet is a transfer mechanism 165 without using the pendulum 900 and male mechanical interface 1000. The transfer mechanism 165 is housed in a transfer mechanism assembly 150 in the center of the pallet as shown in FIGS. 1, 2 and 3. The transfer mechanism is a class of gears called bevel gear 710 driven by the axle of the flap 140, which is affixed to the flap on one side that connects the bevel gear in the transfer mechanism assembly. As the fork tines rotate the flap, the pin 1110 is induced to rotate, turning the bevel gear and rotating an external knob 215, shown in FIGS. 2 and 3.

After the pallet is positioned on the transportation platform by the fork tines which rotates the flaps sideways, and the transfer mechanism assembly 150 is seated in the hole 160, the fork tines are withdrawn. The flaps rotate to a vertical position, turning the bevel gear 710, and inducing the external knob 215 to turn such that the knob locks the platform mate.

To unlock the pallet, the fork tines are inserted in the fork pockets of the pallet, and rotate the flaps sideways, inducing the external knob to rotate and unlock from the platform mate, freeing the transfer mechanism assembly to be lifted up from the transportation platform. In this manner, the embodiment with only the platform mates 110 on the transportation platform locks and unlocks the pallet.

As already described, with the rotating or pivotal flaps and pendulums on the pallet, and with the male mechanical interfaces on the sled which is mounted on the flatbed of the transportation platform, the pallet can be locked and unlocked by fork tines of an automated material handling equipment (MHE). The forklift is a common example of an automated material handling equipment.

A second way to lock or unlock the pallet is to top-lift the pallet, by use of an automated material handling equipment (MHE) that is equipped to top-lift the pallet. This system utilizes the vertical lifting motion of the top-lift pallet to unlock the APPLS system instead of MHE such as fork tines. The motion is transferred via a pull-rod from the top of the load to the flap axle 140, which has a moment arm extending in a substantially horizontal manner. The pull rod pulls on the end of this moment arm, causing the axle to rotate in exactly the same manner as if the flap 140 was caused to rotated by a fork tine.

Figure 4:
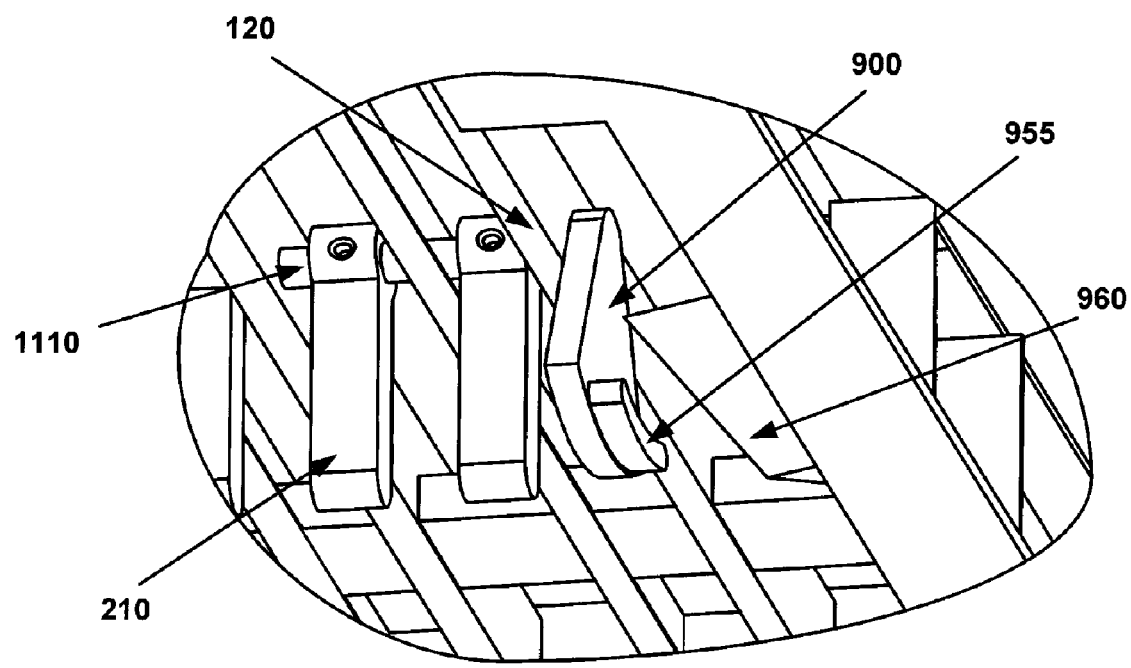
FIG. 4 represents an isometric view of a pendulum that pivots on a rotating pin on a pallet.

FIG. 4 shows the pendulum 900 affixed to the flap 210 in the pallet 120. A protruding curvilinear structure 955 cooperates with a corresponding feature on the male mechanical interface 500 on the sled to lock the pallet. The pendulum will be explained in greater detail in FIG. 9.

Figure 5:
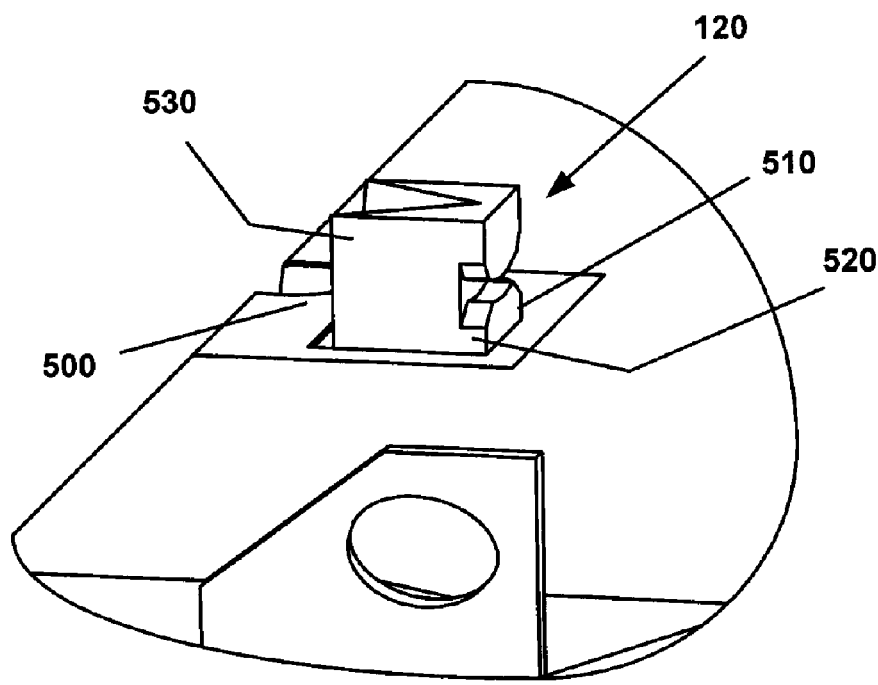
FIG. 5 represents an isometric view of a male mechanical interface mounted on a sled and cooperates with the pendulum on the pallet.

FIG. 5 shows an embodiment of a male mechanical interface 500 mounted on the sled 1210 shown in FIG. 12. The male mechanical interface 500 has a notch 530 for visual marking and mechanical guidance of the pallet 120 to reach the correct position by interfacing with the corresponding feature 960 on the pallet. Two ramps 510 guide a corresponding feature 955 on the pendulum into a cavity 520 for locking the pallet.

Figure 6:
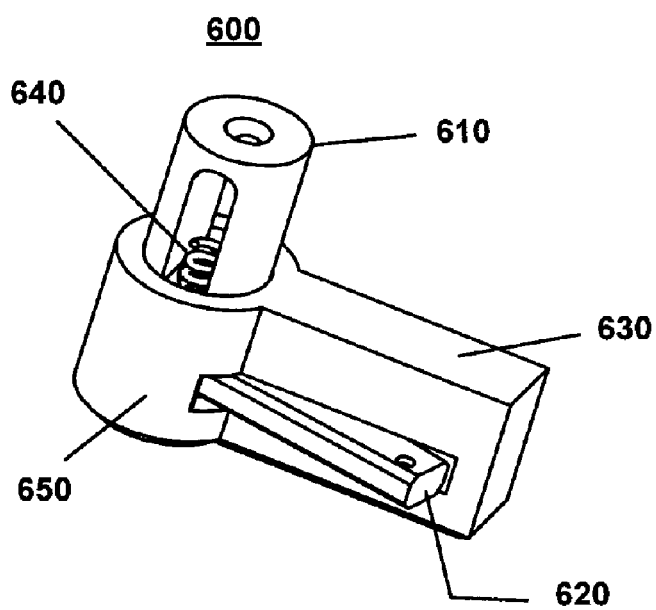
FIG. 6 represents an isometric view an alternative mechanical lock according to the present invention.

FIG. 6 shows another version of lockdown hardware. In this version, the housing 630 is fixed to the bottom of a pallet 120 in several locations. As the MHE lifts the pallet, the MHE tines lift a bar that then lifts the rotation cylinder 610. This cylinder then rotates the locking flap 620 to interface with a corresponding feature on the transport platform via a helical spline 650.

Figure 7:
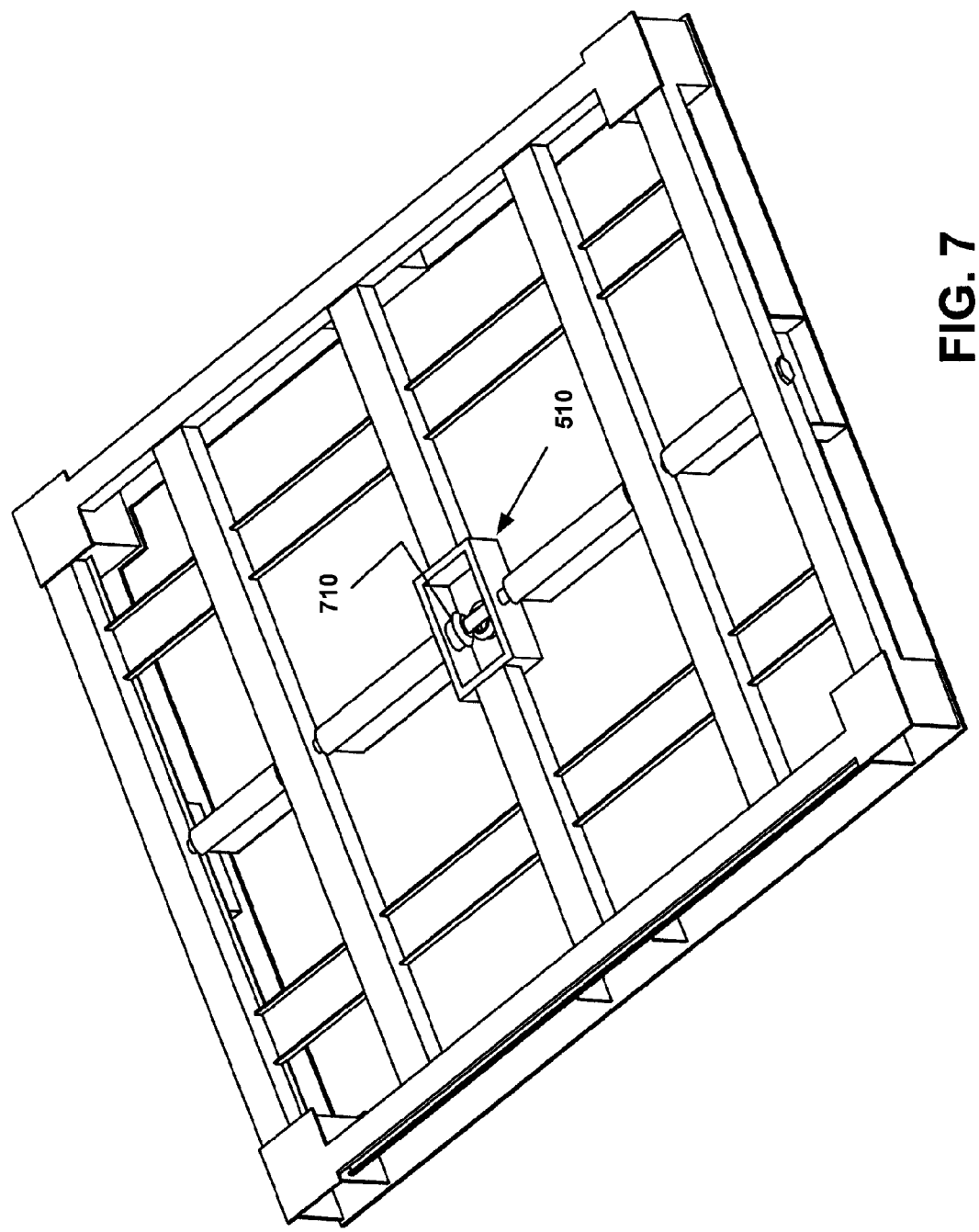
FIG. 7 represents an isometric view of a bevel gear driven by the rotating pin connected to the flap.

FIG. 7 shows a bevel gear 710 in the transfer mechanism assembly 150 that has been explained in conjunction with the fork tines to lock and unlock the pallet in FIG. 1.

Figure 8:
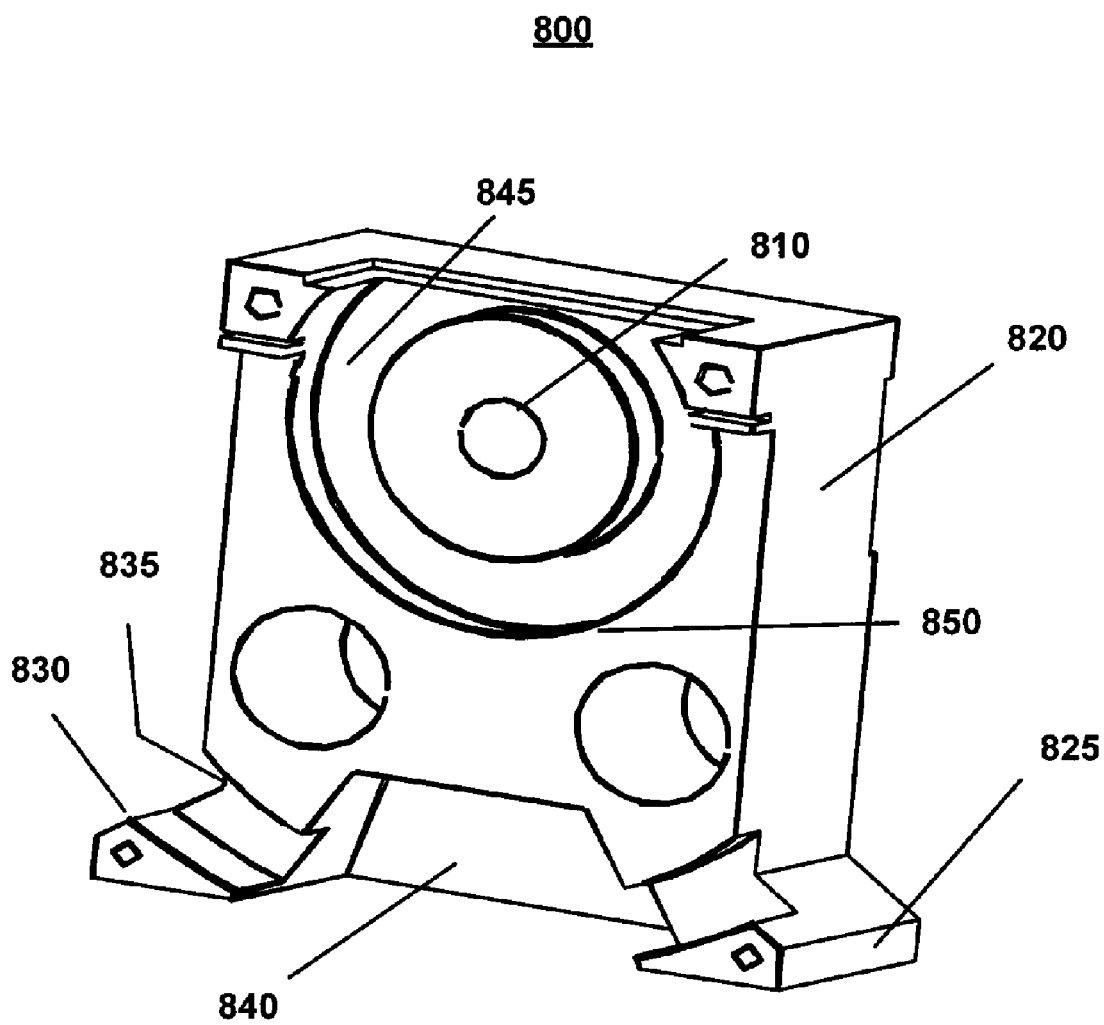
FIG. 8 represents an isometric view of a self-alignment pendulum housing that guides the pendulum attached to it to slide into a male mechanical interface mounted on the sled or flatbed.

FIG. 8 illustrates an isometric view of a pendulum housing 800 that is attached to the side port 145 in the pallet 120. The housing has a body 820 and a pair of feet 825 that stand on the transportation platform flush with the base of the pallet 120. Each foot has an inwardly concave curvature 830 to provide for a curved cavity 835 to accommodate the corresponding curved extension 955 of the pendulum 900 in FIGS. 4 and 9 for insertion and locking with the male mechanical interface 1000 in FIG. 10. The pendulum housing has a hole 810 that provides for the pin 1110 to pass through and pivot or rotate.

The pendulum 900 is affixed to the pin 1110 through its hole 910 such that its curved extension 955 rotates without restriction through the curved cavity 835 in the pendulum housing 800. The housing 800 has a truncated triangular or pyramidal recess at the base to cooperate with a corresponding shape of the male mechanical interface 1000 for the pallet to self-align and lock with the male mechanical interface.

Figure 9:
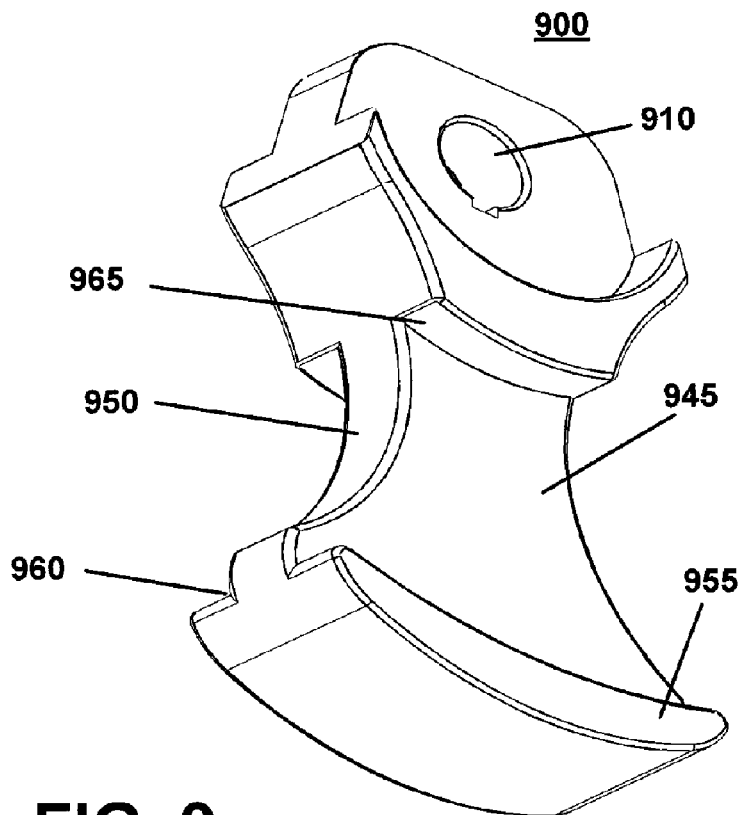
FIG. 9 represents an isometric view of a pendulum that slides into and locks the male mechanical interface.

FIG. 9 illustrates an isometric view of the pivotal pendulum 900. The pendulum fits through the pin 1110 that is connected to the pendulum housing 800. The pendulum 900 has a body 945 and curved sides 950 of roughly an hour glass shape such that the upper half pivots on the pin 1110 around the hole 910, and the lower half has two curved side extensions 955.

The pair of side extensions 955 extends outwards to fit in slots 1050 in FIG. 10 in sliding contact. On the side extensions 955, the upward facing concave surfaces 960 are constrained by the mating convex surfaces or shoulders 1065 on the male mechanical interface 1000, and lock the pallet to the male mechanical interface on the flatbed when the pallet is lowered down to rest.

FIG. 10 illustrates an isometric view of the male mechanical interface 1000 on the sled of FIGS. 12 and 13. The male mechanical interface is generally of a truncated triangular or pyramidal shape with a flat top 1010 and a body 1030. On two opposing sides of the body 1030 two linear slopes 1020 present a pair of flat surfaces slanting outwards that cooperate with the pendulum housing 800 mounted on a pallet 120. Orthogonal to the surfaces 1020, another pair of opposing surfaces 1005 also form a pair of linear slopes slanting outwards to connect the flat top 1010 to a wider base 1060. Together the two pairs of surfaces 1020 and 1005 form the truncated pyramid shape of the male mechanical interface.

The flat top surface 1010 has a longitudinal slot 1025 that extends downwards into two additional parallel longitudinal slots 1050. The adjoining shoulder 1065 between the slot 1025 and each of two slots 1050 has a convex curvature in the longitudinal axis of slot 1025 to match a corresponding curvature surface 960 on a side extension 955 on a pendulum 800. In cross-section, the slots 1025 and 1050 form an inverted-T shape to receive and lock a pivoting pendulum from the base of a pallet.

The four corners of the male mechanical interface 1000 are fitted with holes 1040 such that bolts fasten the male mechanical interface to the flatbed 1030 through a spacer 1220. The screws can be quickly installed and uninstalled such that the present system can be reconfigured quickly in the field in response to a sudden change or emergency. They can also be mounted on a modified flatbed such that they can be raised for use or retracted into the bed when not desired without the need for removing bolts.

The base of the pendulum housing 800 has a recess 840 that matches the truncated pyramidal shape of the mating male mechanical interface 1000. Two outwardly extending legs 825 form the base of the recess 840. When the pallet is lowered in the vicinity of the male mechanical interface in the axial direction of the longitudinal slot 1025, one of the two legs 825 of the housing 800 engages and slides down one of the two sides 1020 on the male mechanical interface 1000. In this manner, the pallet self-aligns to the male mechanical interface on its way down or the pendulum to lock with the male mechanical interface.

With the pendulum resting in a vertical position in the cavity 1025 in FIG. 10, the downwardly convex side extensions 955 lock the pallet to the male mechanical interface 1000 in three orthogonal directions. One direction is parallel to and two directions are transverse to the longitudinal axis of the slot 1025.

The pallet in the present system increases flexibility to carry cargo of a general shape and size. The pallet size can be chosen to more closely match the size and shape of the cargo, and the remaining void in the pallet can be more easily filled with protective packing materials. For any pallet size chosen, the sleds can be easily reconfigured on the transportation platform.

Figure 11:
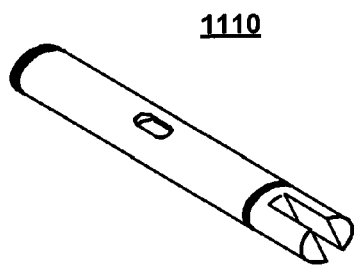
FIG. 11 represents an isometric view of the pin on the pallet that connects the flap, the self-alignment pendulum housing and the pendulum.

FIG. 11 is an isometric view of the pin 1110 that supports the flap 140 in the pallet 120 in FIG. 1 and the pendulum 900 in FIG. 9. The function of the pin has already been explained previously.

FIG. 12 is an isometric view of the sled 1210 that includes a plate 1220 and a multitude of male mechanical interface 1000 that are mounted on the plate 1220. A possible embodiment of the sled has a length of 100 inches and a width of 80 inches. The sled has 8 male mechanical interfaces 1000 that support 4 pallets that each measures 50 inches in length and 40 inches in width. This sled 1210 can be used as an interface device between a standard flatbed and the APPLS-enabled pallets. However, the male mechanical interfaces 1000 can also be integrated into the actual flatbed itself, as explained previously.

FIG. 13 illustrates an isometric view of a male mechanical interface 1000 on a sled 1210, which is mounted on the flatbed 1030 over a spacer 1020. The male mechanical interface has already been explained in detail.

Figure 14:
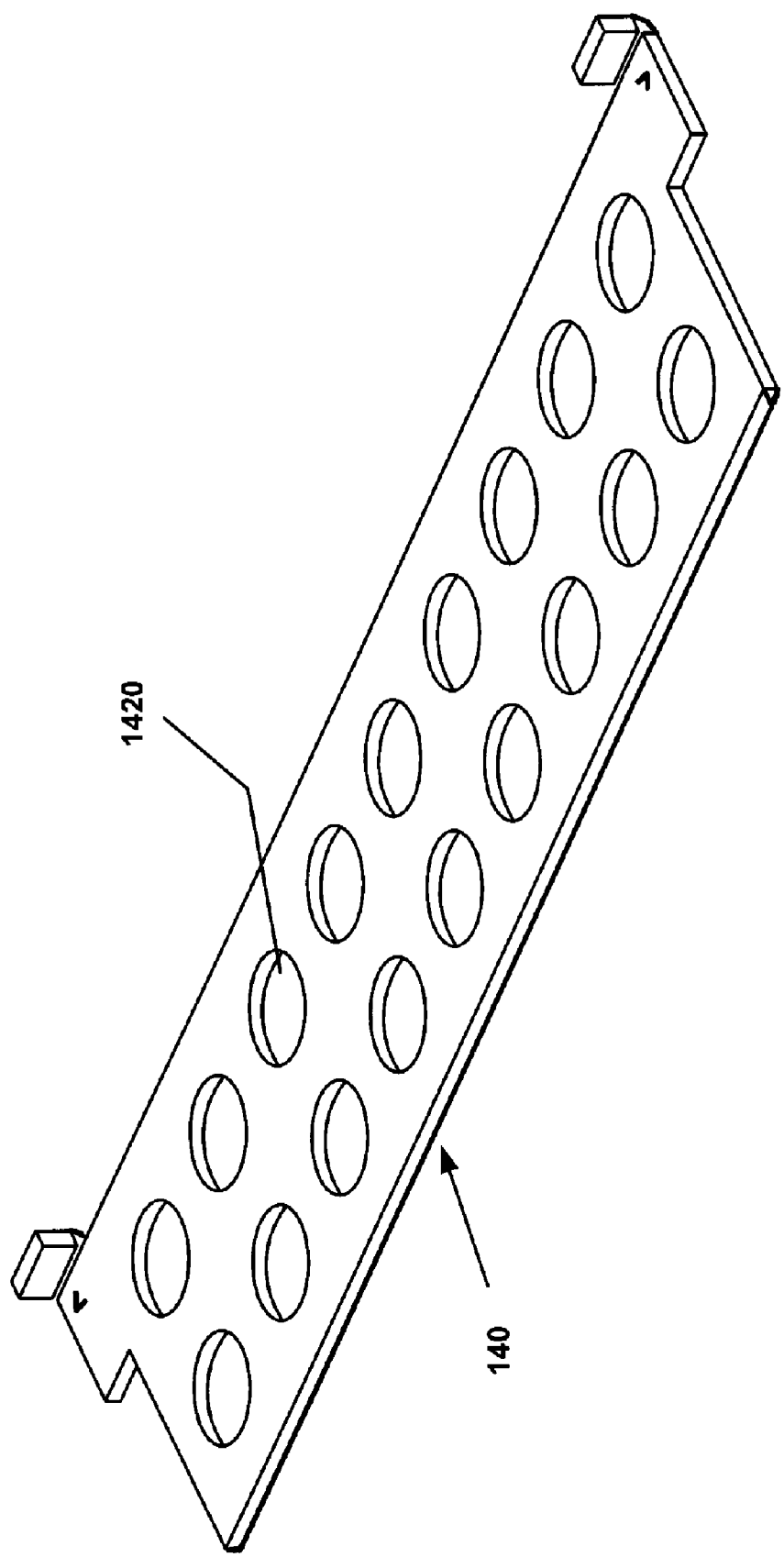
FIG. 14 represents an isometric view of an embodiment of a flap in the pallet.

FIG. 14 illustrates an isometric view of a flap 140 with rectangular shape and interior holes 1420 that are round. It is another embodiment of the flap 140 shown in FIG. 1.

Figure 15:
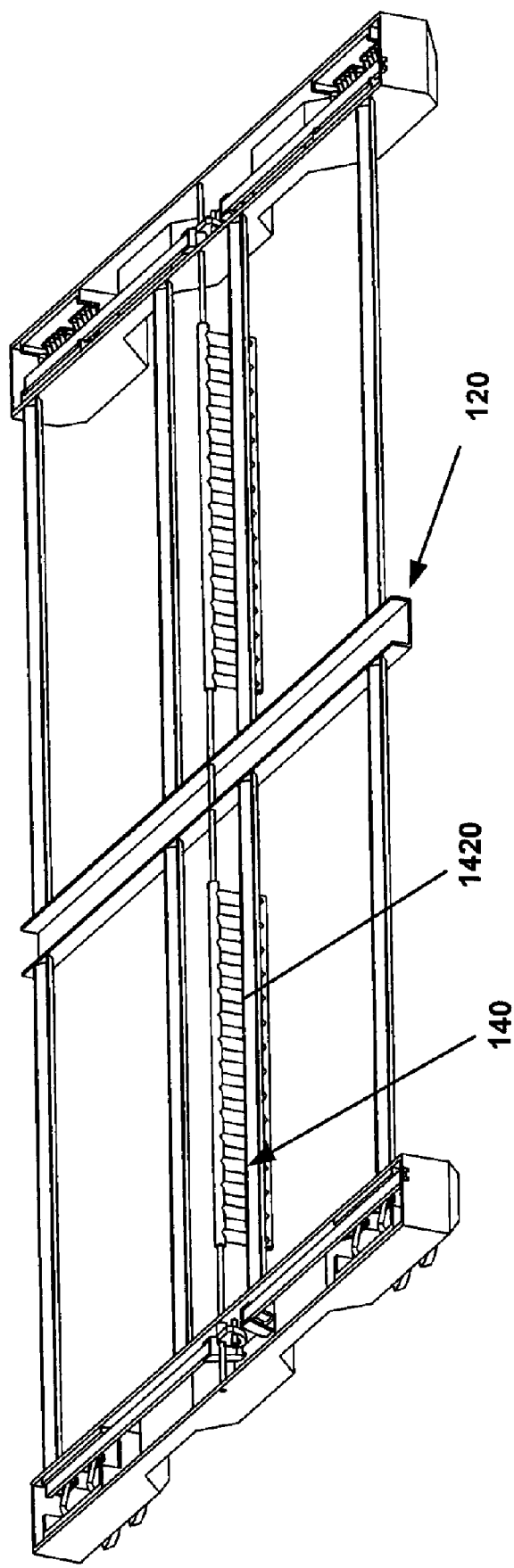
FIG. 15 represents an isometric view of another embodiment of a mechanically locking system in contrast to the flap and the pallet of FIG. 1.

FIG. 15 illustrates an isometric view of yet another embodiment of a flap 140 with rectangular shape and interior holes 1420 that are rectangular. The flap supported by the pallet 120 is in a vertical position and is not being pushed by fork tines. The flap is another embodiment of the flap 140 shown in FIG. 1.

Figure 16:
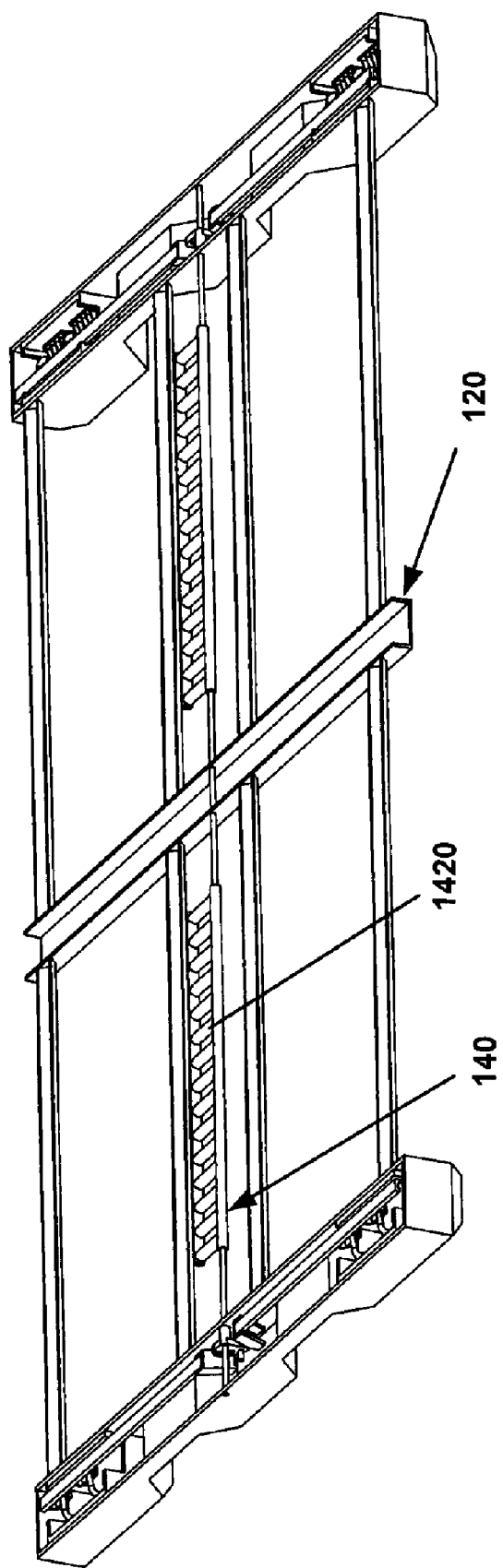
FIG. 16 represents an isometric view of the flap of FIG. 15 rotated from a vertical to a sideways or horizontal position for unlocking the mechanical locks.
Figure 17:
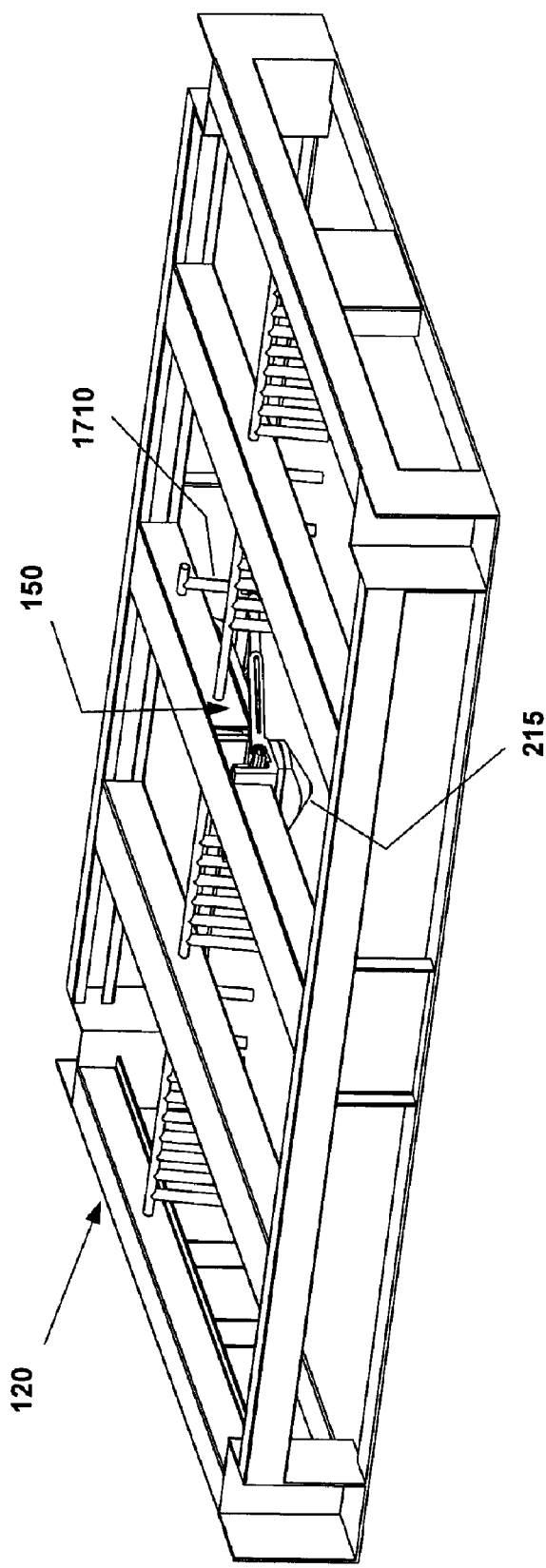
FIG. 17 represents an isometric view of an additional version of the locking mechanism that incorporates a standard International Standard Lock (ISO lock) as the primary locking devices actuated by pushrods connected to a flap.

FIG. 16 illustrates an isometric view of the embodiment shown in FIG. 15, with the flap 140 rotated sideways or horizontally by the fork tines under the pallet 120.

All of these systems are capable of double stacking when the pallet is built with sufficient strength and size. If the pallet is built so the base pallet 120 is the base of a large container that is built to contain the cargo, the male receptacles 155 1000 can be incorporated into the top of the container. Thus another pallet may be stacked on top of it and locked down just as it would be on the sled 1210.

All drawings are illustrative in nature and do not depict the actual size or scale of the objects shown. It is to be understood that the specific embodiments of the invention that have been described are merely illustrative of certain applications of the principle of the present invention. Numerous modifications may be made to a system and method to automatically lock pallets to a transportation platform.

What is claimed is:

1. A system for automatically locking a pallet to a platform comprising:
   a platform:
   a sled with a male mechanical interface, wherein the sled is mounted on the platform;
   a pendulum housing on the pallet;
   a pendulum on the pallet;
   a rotating feature on the pallet;
   a side port on the pallet;
   wherein the pendulum housing is affixed to the side port; and
   wherein the feature is secured to the side port and connects the rotating pendulum.

2. The system of claim 1, further comprising a transfer mechanism assembly secured to the pallet.

3. The system of claim 2, wherein the pallet further comprises a flap that is rotatably connected to the transfer mechanism assembly.

4. The system of claim 1, wherein a rotation of a flap induces the pendulum to rotate through the rotating feature.

5. The system of claim 4, wherein the flap and the pendulum rotate bi-directionally from a vertical position.

6. The system of claim 5, further comprising fork tines that cause the flap to rotate along two opposing directions.

7. The system of claim 6, wherein the pendulum comprises at least one curved side extension.

8. The system of claim 7, wherein the male mechanical interface comprises a guide that guides the pendulum housing to self-align with the male mechanical interface.

9. The system of claim 8, further comprising a curved slot to receive the curved extension of the pendulum for the pendulum to slide through.

10. The system of claim 9, wherein the pendulum locks the male mechanical interface.

* * * * *